United States Patent
Beale et al.

(10) Patent No.: US 12,079,650 B2
(45) Date of Patent: Sep. 3, 2024

(54) VIRTUAL PROCESSOR SYSTEM AND METHOD UTILIZING DISCRETE COMPONENT ELEMENTS

(71) Applicants: Andrew Ward Beale, Irvine, CA (US); David Strong, Irvine, CA (US)

(72) Inventors: Andrew Ward Beale, Irvine, CA (US); David Strong, Irvine, CA (US)

(73) Assignee: Unisys Corporation, Blue Bell, PA (US)

( * ) Notice: Subject to any disclaimer, the term of this patent is extended or adjusted under 35 U.S.C. 154(b) by 429 days.

(21) Appl. No.: 16/875,016

(22) Filed: May 15, 2020

(65) Prior Publication Data

US 2021/0357240 A1 Nov. 18, 2021

(51) Int. Cl.
*G06F 9/455* (2018.01)
*G06F 12/06* (2006.01)

(52) U.S. Cl.
CPC .......... *G06F 9/45558* (2013.01); *G06F 12/06* (2013.01); *G06F 2009/45583* (2013.01); *G06F 2212/7201* (2013.01)

(58) Field of Classification Search
CPC ... G06F 2212/7201; G06F 2009/45583; G06F 12/06; G06F 9/45558
See application file for complete search history.

(56) References Cited

U.S. PATENT DOCUMENTS

| | | | |
|---|---|---|---|
| 2009/0106329 A1* | 4/2009 | Masuda | G06F 16/2379 |
| 2017/0286673 A1* | 10/2017 | Lukacs | G06F 21/566 |
| 2019/0065226 A1* | 2/2019 | Neiger | G06F 9/45558 |
| 2020/0348954 A1* | 11/2020 | Banerjee | G06F 9/45545 |

* cited by examiner

*Primary Examiner* — Charles Rones
*Assistant Examiner* — Han V Doan
(74) *Attorney, Agent, or Firm* — Shook, Hardy & Bacon L.L.P.

(57) ABSTRACT

A system and method for the dynamic, run-time configuration of logic core register files, and the provision of an associated execution context. The dynamic register files as well as the associated execution context information are software-defined so as to be virtually configured in random-access memory. This virtualization of both the processor execution context and register files enables the size, structure and performance to be specified at run-time and tailored to the specific processing, instructions and data associated with a given processor state or thread, thereby minimizing both the aggregate memory required and the context switching time. In addition, the disclosed system and method provides for processor virtualization which further enhances the flexibility and efficiency.

22 Claims, 17 Drawing Sheets

VIRTUAL PROCESSOR SYSTEM AND METHOD UTILIZING DISCRETE COMPONENT ELEMENTS

BACKGROUND OF THE INVENTION

In the field of microprocessor system architecture and design, maximizing the utilization of the processing capabilities of a given processor core is a crucial with respect to the performance and productivity of computing system. One of the most widely utilized approaches to accomplish this goal is the utilization of microprocessor systems that employ simultaneous multithreading ("SMT"); an architecture that enables a single core to intelligently process two separate tasks or "threads" simultaneously.

FIG. 1A provides a simplified representation of a single-core microprocessor system 100 that utilizes SMT. As shown, in a first configuration core logic 102 is switchably linked (104) to register grouping A (106) and data path 108. Register grouping A stores instructions and data defining a first processor state for microprocessor system 100. Core logic 102 then utilizes its internal resources (e.g., Adder, Arithmetic Logic Unit) to process instructions and data, acquired from register grouping A, and returns results of the processing to register grouping A via data path 110. As internal resources within core logic 102 become available to accept instructions and data from register grouping B (112) (a condition that can occur while other internal resources of core logic 102 are still processing the instructions/data acquired from register grouping A), core logic is switchably linked (104) to register grouping B (112) (see FIG. 1B) register grouping B stores instructions and data defining a second processor state for microprocessor system 100. As shown, in this second configuration, core logic 102 is linked (104) to register grouping B (112) and data path 114 to permit the fetching of instructions and data from register grouping B. The available internal resources of core logic 102 can then process the instructions and data acquired from register grouping B (returning processing results to register grouping B via data path 116). The selective utilization of Register groupings A and B by single-core microprocessor system 100 enables the internal resources of core logic 102 to appear to be simultaneously processing instructions and data acquired from both register groupings (simultaneous multithread processing).

Although SMT processing enables a single physical processor to perform as if there were two separate logical processors within the microprocessor system, SMT is still constrained by the physical limitations of the associated register groupings (register groupings A and B in the above example). Within a given microprocessor, these associated register groupings are physical register groupings fabricated within the same monolithic semiconductor structure as the core logic. These physical register groupings have a fixed size and structure that dictate the amount of data that may be stored within them, and the manner in which such data can be stored and/or accessed. These register groupings are fixed, physical semiconductor structures within the microprocessor and cannot be modified or reconfigured. In addition, the processor's instruction set which defines how these fixed register groupings are addressed and accessed is also static, and cannot be reconfigured or altered.

The physical register groupings within modern microprocessors can each consist of a large number of individual registers. These sizable register groupings, combined with the static nature of the instruction for accessing the register groupings, typically result in a significant number of clock cycles being required for a given set of instructions or data to be acquired from the register grouping architecture and provided to a logic core. The larger the register grouping, the greater the possible clocking delay and consequential loss of processor efficiency.

Consequently, there exists a need for a system and method that provides the ability, at run-time, to dynamically define the configuration, capacity, and other aspects of the register files associated with one or more logic cores, and to provide the proper context to enable any associated logic core to access and execute the information contained in the dynamic register files, thereby achieving increased processing speed and efficiency.

BRIEF SUMMARY OF THE INVENTION

A system and method for the dynamic, run-time configuration of logic core register files, and the provision of an associated execution context. The dynamic register files as well as the associated execution context information are software-defined so as to be virtually configured in random-access memory. This virtualization of both the processor execution context and register files enables the size, structure and performance to be specified at run-time and tailored to the specific processing, instructions and data associated with a given processor state or thread, thereby minimizing both the aggregate memory required and the context switching time. In addition, the disclosed system and method provides for processor virtualization which further enhances the flexibility and efficiency.

BRIEF DESCRIPTION OF THE DRAWINGS

The aspects, and advantages of the present invention will become better understood with regard to the following description, appended claims, and accompanying drawings in which:

DETAILED DESCRIPTION

Figure 2:
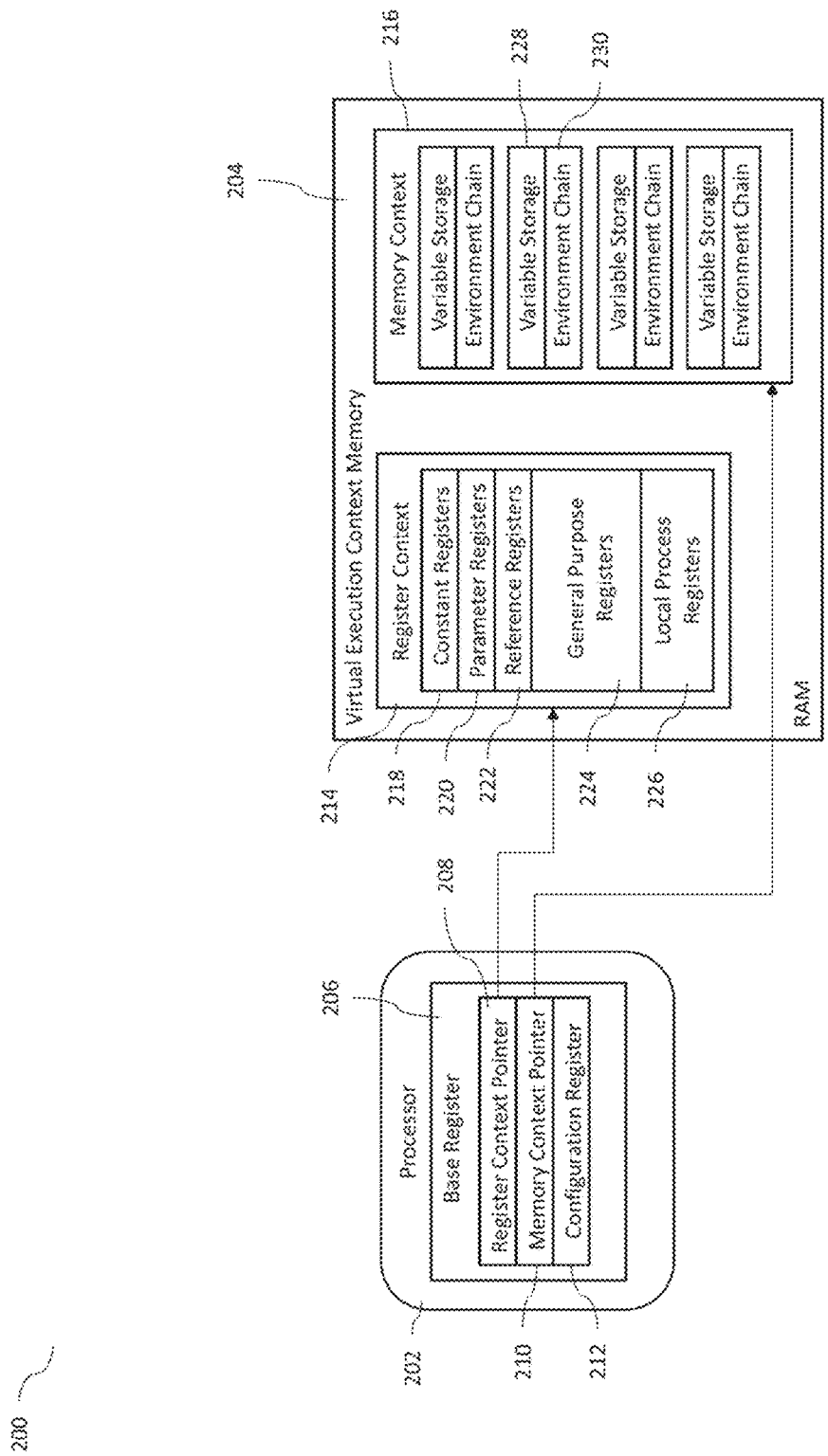
FIG. 2 is a functional block diagram of a processor and memory arrangement supporting a preferred embodiment of a system and method utilizing dynamic register files.

FIG. 2 is a functional block diagram of a processor and execution memory system (200) supporting a preferred embodiment of a system and method utilizing dynamic register files. As shown, system 200 consists of processor 202 and virtual execution context memory 204. Processor 202 includes base register contexts 206, register context pointer 208, memory context pointer 210, configuration register 212. Virtual execution context memory 204 is defined by software in a configurable random-access memory storage system, such as a DRAM or SRAM. The execution context memory stores information indicative of a register context (214) and an associated or paired memory context (216). Register context information 214 can include information typically associated with defining a processor state (I.e., processing a given thread), such as constant registers 218, parameter registers 220, reference registers 222, general purpose registers 224 and local process registers 226. Similarly, memory context information 216 within execution context memory 204 can include information such as variable storage information 228 and environment chain information 230.

Figure 1A:
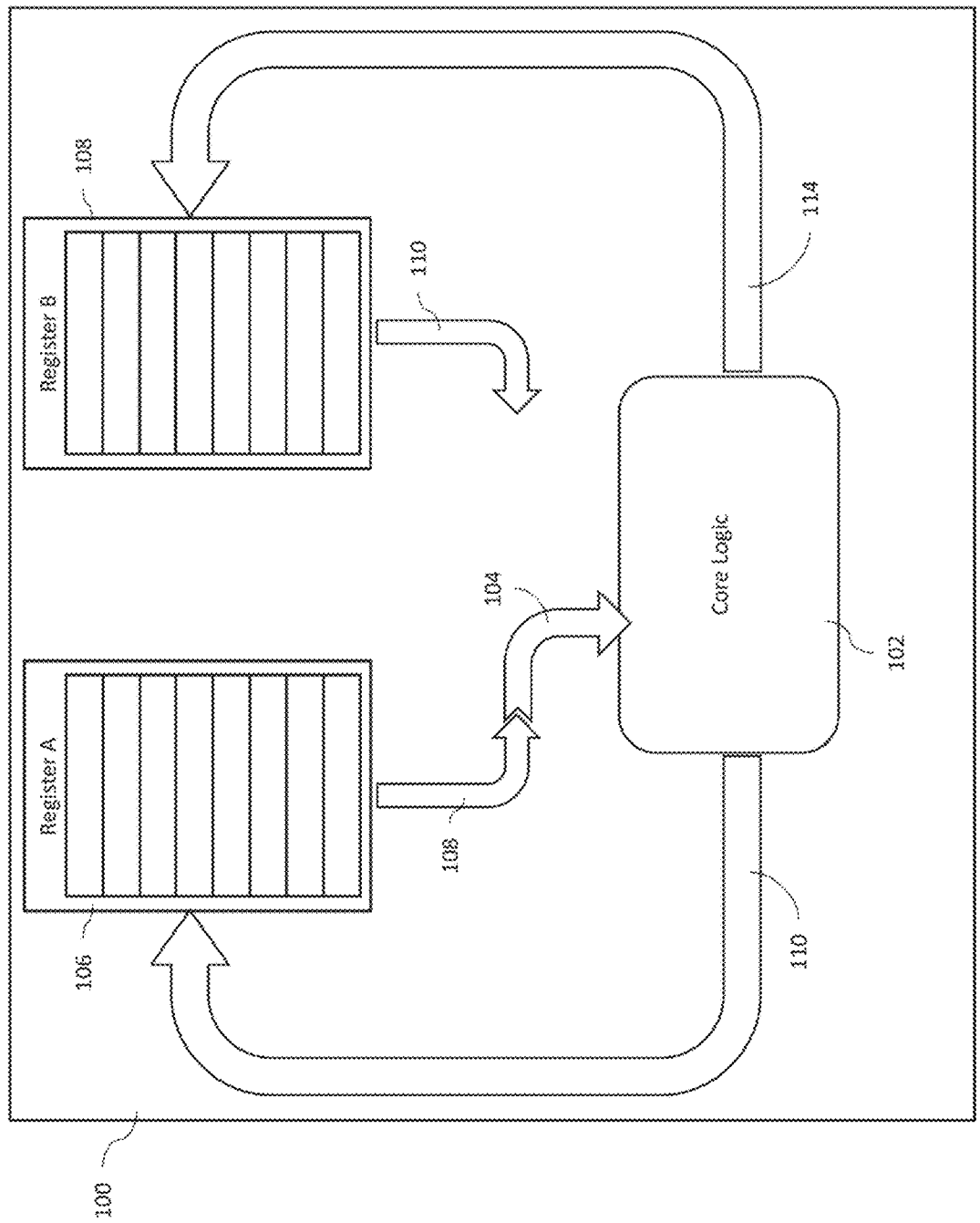
FIG. 1A is a simplified functional diagram of a single core microprocessor SMT system in a first configuration.
Figure 1B:
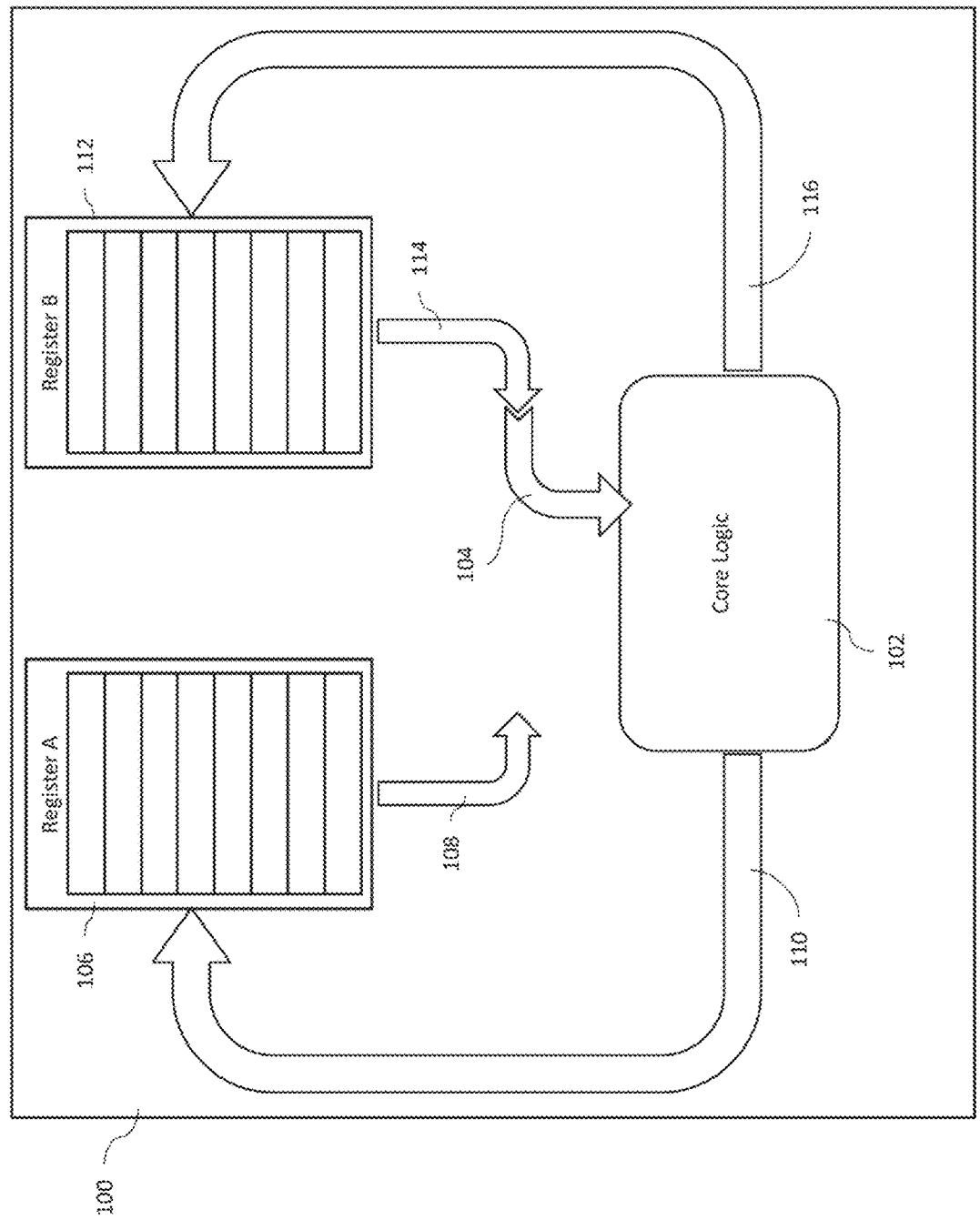
FIG. 1B is a simplified functional diagram of system of FIG. 1A in a second configuration.

The functionality of the system depicted in FIG. 2 is similar to that of the system depicted in FIGS. 1A and 1B, in as much as the information stored in virtual execution context memory 204 defines the state of processor 202. However, there are numerous critical advantages offered by system 200. For example, virtual execution context memory 204, being a software-defined construct within RAM is not comprised of fixed physical registers fabricated within a monolithic semiconductor structure housing a fixed core logic. Rather, execution context memory 204 is configured to have precisely enough capacity to contain the register context information 214 and paired memory context information 216 that define a given state of processor 202. "Right-sizing" the amount of RAM allocated for each of the associated registers, variable storage and/or environmental chains to define and support a particular state of processor enables the information contained in virtual execution context memory 204 to be accessed very efficiently. This right-sizing can be performed at run-time so as to dynamically define the amount of memory within the configurable random-access memory storage system designated for each of the registers, chains and variable stores within execution context 204.

For example, if defining a particular processor state required 1 Mbytes of parameter register context information 214, then 1M byte of space within random-access memory storage system would be designated for that purpose. Similarly, if 256 Kbytes of memory context information 216 was required to define a particular processor state, then 256 Kbytes of RAM would be designated for that purpose within virtual execution context memory 204. This permits processor 202 to access requisite information from execution context memory 204 without the inherent inefficiency introduced by a fixed physical register structure that is likely to have a capacity far in excess of what is required to support the register context information (214) or memory context information (216) required to define a particular processor state.

Unlike with a fixed, arbitrarily-sized physical register grouping, the registers and memory context information (214 and 216, respectively) are accessed directly from the software-defined registers within RAM without the need for extraneous clocking to move desired information through a fixed physical register. Register context pointer 208 within processor 202 provides the particular RAM address at which the register context information is stored. Similarly, processor 202's memory context pointer 210 provides the particular RAM address at which the memory context information is stored. The requisite context information is efficiently retrieved and processed, enabling processor 202 to efficiently assume a defined state and process an associated thread. This direct access of right-sized execution context information also permits processor 202 rapidly switch between one state or thread and another, offering greatly improved processor efficiency when compared to a conventional fixed register processor architecture.

The system and method of the present invention offers an additional advantage over conventional, fixed-in-silicon core and register processor architecture. In such conventional processor architecture, the stored memory context information relates to the entire platform. If such platform-wide information were to be breached, it could provide a basis for platform-wide unauthorized access and the compromising of all of the information associated with the platform. Contrastingly, the disclosed system and method utilize context pointers within a logical processor. These context pointers (register context, memory context, etc.) are not accessible outside of the execution context in which they reside. Furthermore, each pointer only provides direction to a specific RAM location and would not provide any indicia useful in attaining unauthorized platform-wide access. There is simply is no platform-wide information stored within the base registers. In fact, the architecture in the invention fails to even have a platform that could be viewed as analogous (and therefore as vulnerable) to the physical semiconductor structure upon which present microprocessor technology is typically fabricated.

Figure 3:
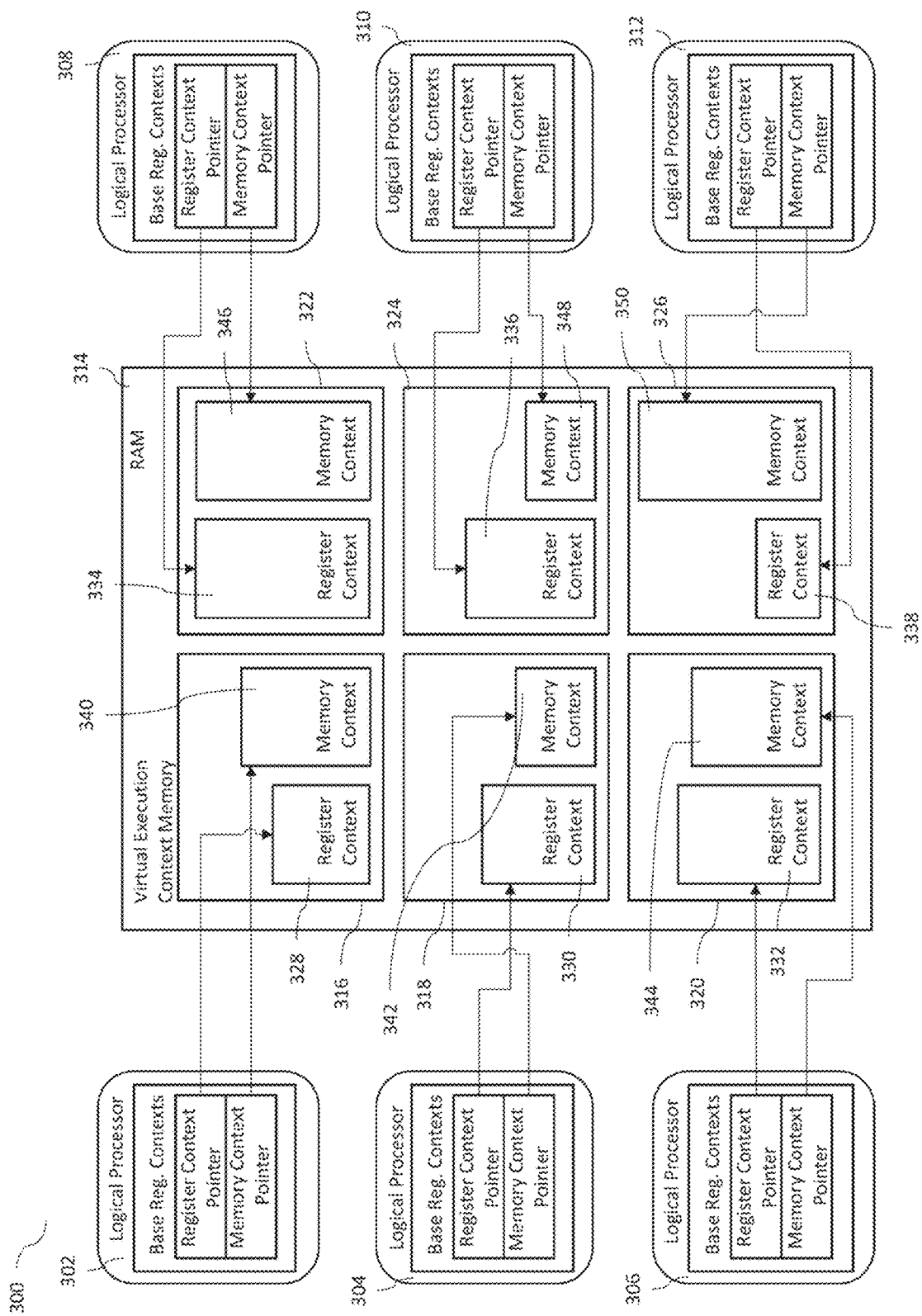
FIG. 3 is a functional block diagram of logical processor and memory arrangement supporting a preferred embodiment of a system and method utilizing dynamic register files.

Processor 202 can be a processor utilizing a single core system (similar to the processor depicted in system 100 of FIGS. 1A and 1B), or a processor employing a multi-core architecture. Each of the cores being capable of utilizing SMT or a similar strategy to perform as two or more logical processors, wherein the state of a given a logical processor would be defined by the accessed register context information and memory context information. A functional block diagram of one such multi-logic core system (300) is illustrated in FIG. 3. As shown, system 300 includes six logical processors (302-312) configured to access virtual execution context memory 314. These logical processors each include base register context information (316-326), which although critical to the operation of processor 202, typically reside outside of the physical package housing the processors logic core(s) so as to enable them to be utilized by other active execution processes.

Each of the logical processors (302-312) respectively accesses one pair of register context information 328-338 and memory context information 340-350 within virtual execution context memory 314. The logical processors then each execute the thread defined by the respective paired register and memory context information. As internal resources within a logical processor become available to accept instructions and data associated with a different thread, the logical processor can access alternate register and memory context information pairs within virtual execution context memory 314. For example, assume that resources within logical processor 302 become available after completing the processing of a thread that was defined by register context information 328 and memory context information 340. Virtual processor 302 could then be utilized to execute a thread defined by accessing register context information 330 and memory context information 342.

Figure 4:
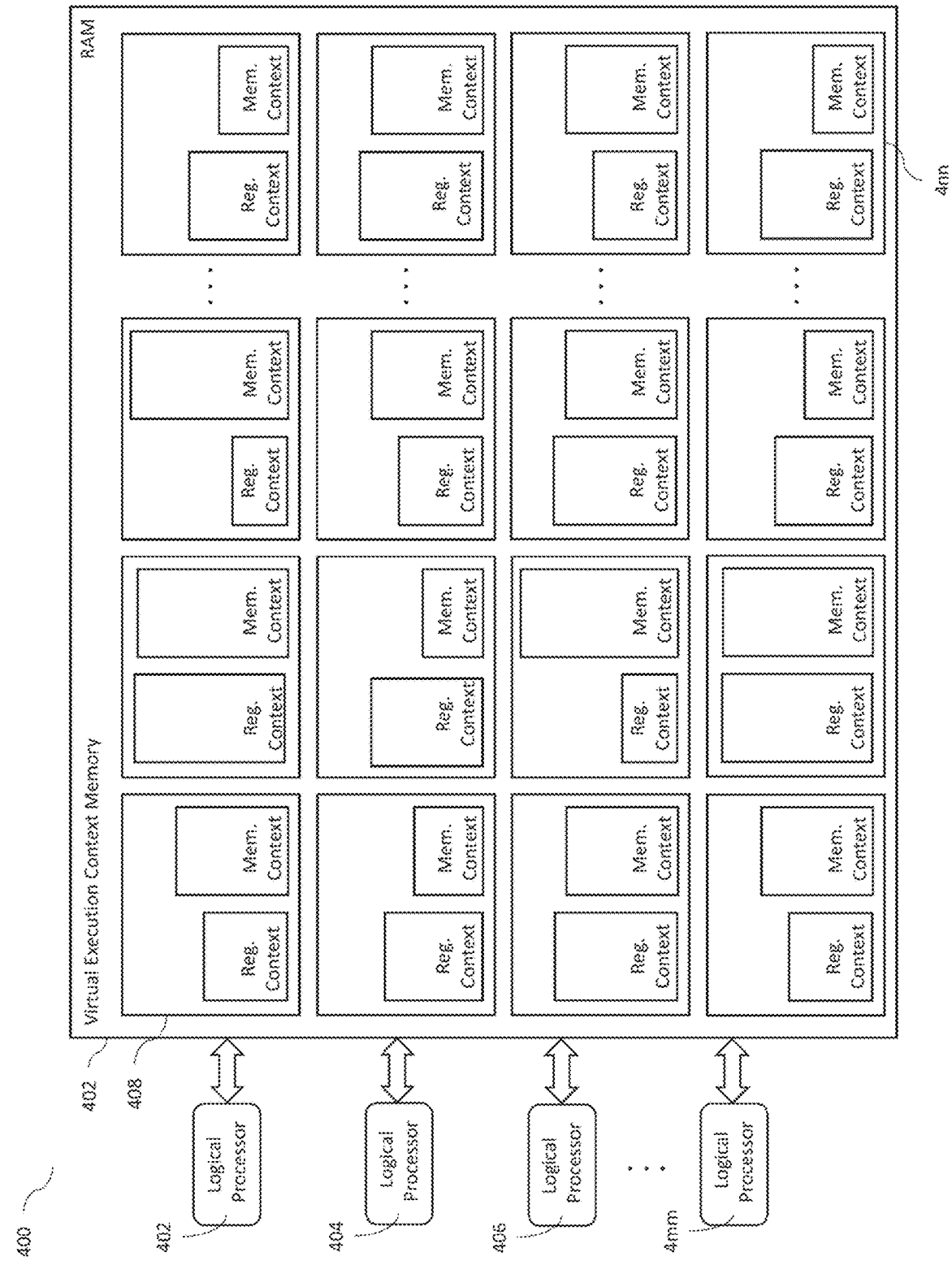
FIG. 4 is a functional block diagram of a system of multiple logical processors and a memory arrangement supporting an alternate preferred embodiment utilizing dynamic register files.

As previously stated, the paired register context and memory context information is stored within RAM, and consequently it will be understood that that the number of such pairings is limited only by the size of the available RAM. FIG. 4 provides a functional block diagram of a system (400) wherein virtual execution context memory 402 includes paired register and memory context information 408 through 4*nn*. These right-sized register and memory context pairings define a different processor state for processing a particular thread. Each of the register and memory context pairings is accessible by any one of logical processors 402-4*mm*, utilizing register and memory context pointer information stored within each logical processor. This enables any available resources within any one of the six logical processors to assume the state and execute the thread defined by any one the of the register and memory context pairings stored within virtual execution context memory 402.

Figure 5A:
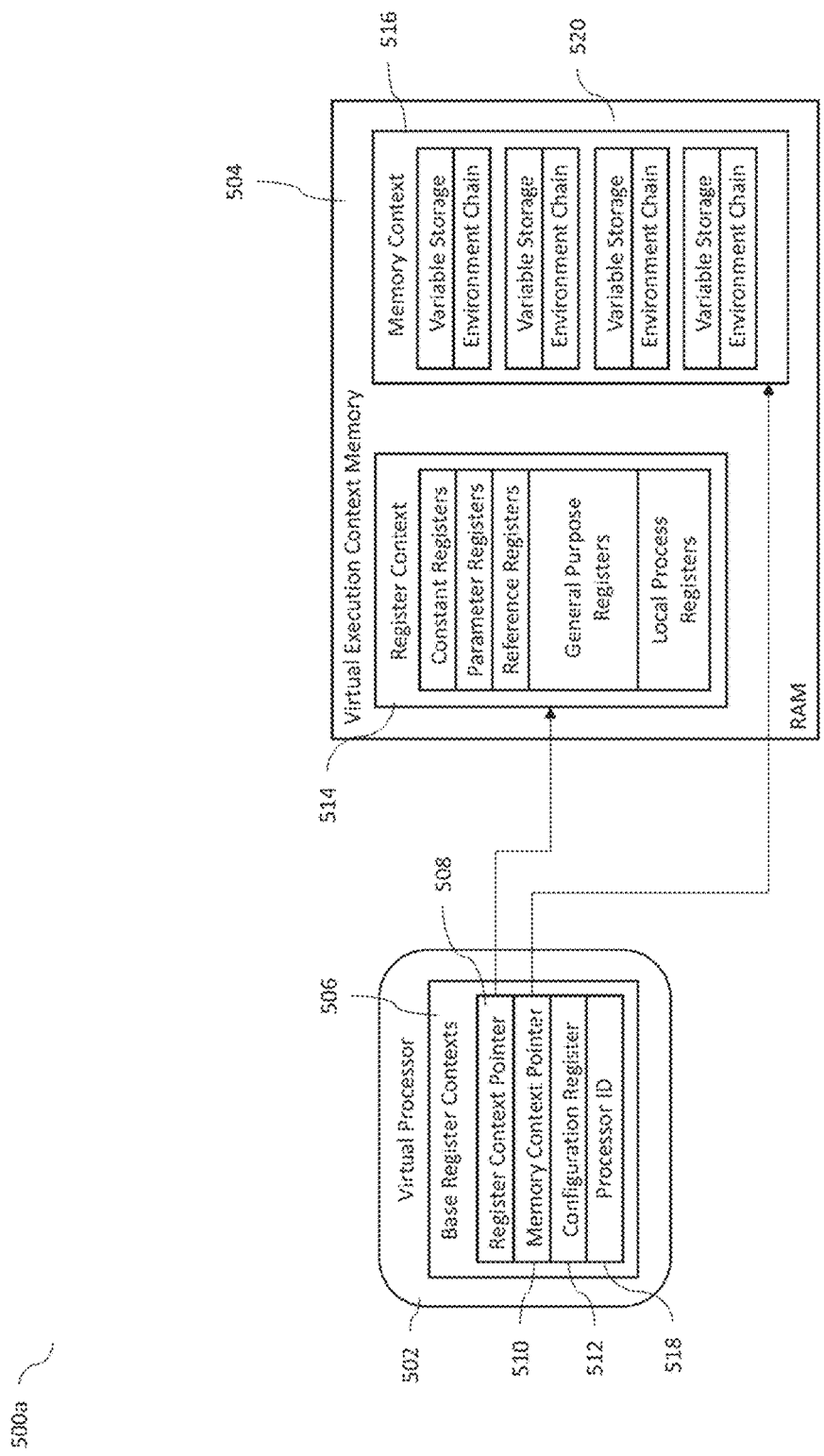
FIG. 5A is a functional block diagram of a virtual processor system and memory arrangement supporting an additional preferred embodiment utilizing dynamic register files.
Figure 5B:
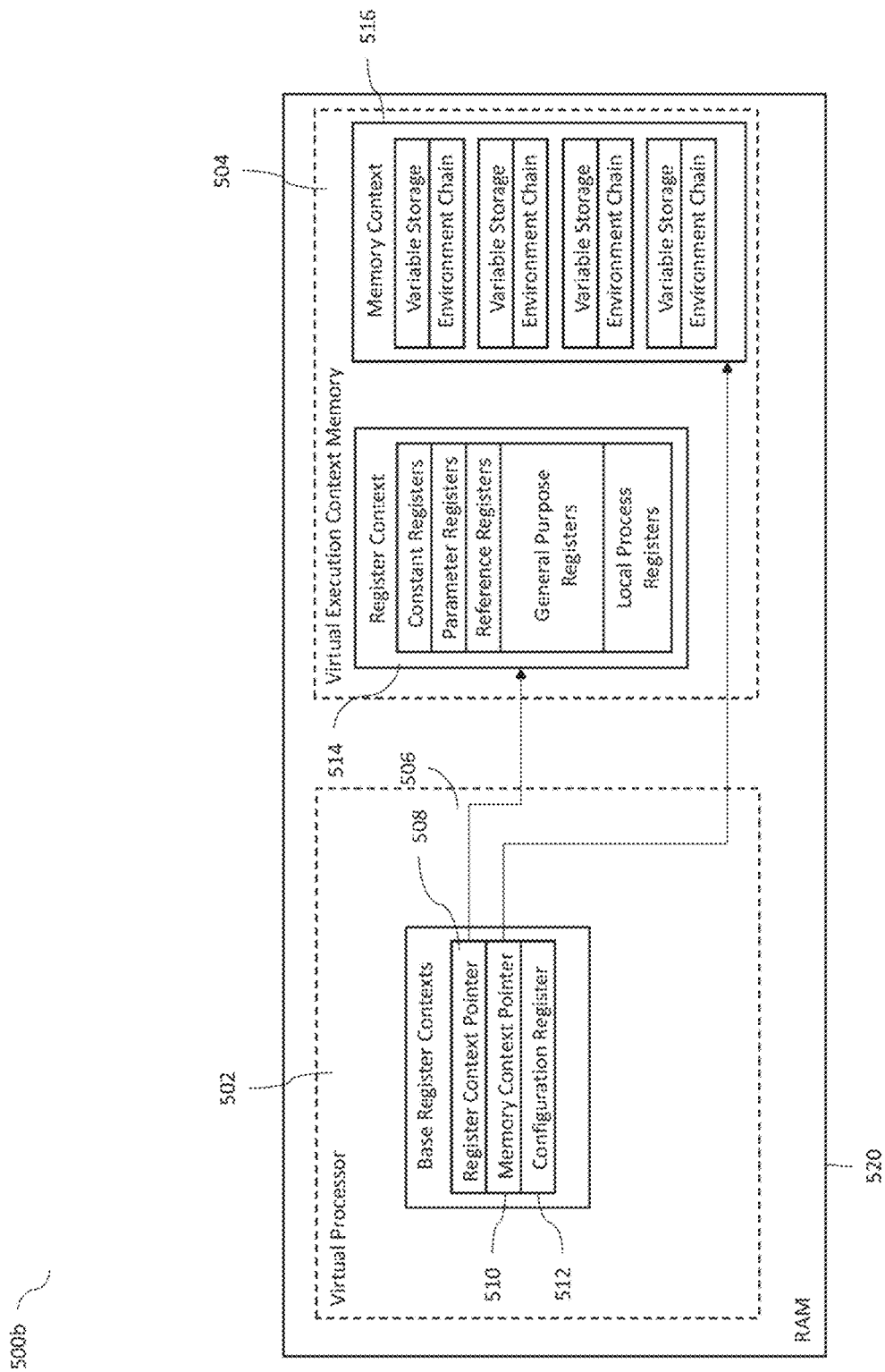
FIG. 5B is a functional block diagram of an alternate virtual processor system and memory arrangement supporting yet another preferred embodiment utilizing dynamic register files.
Figure 6:
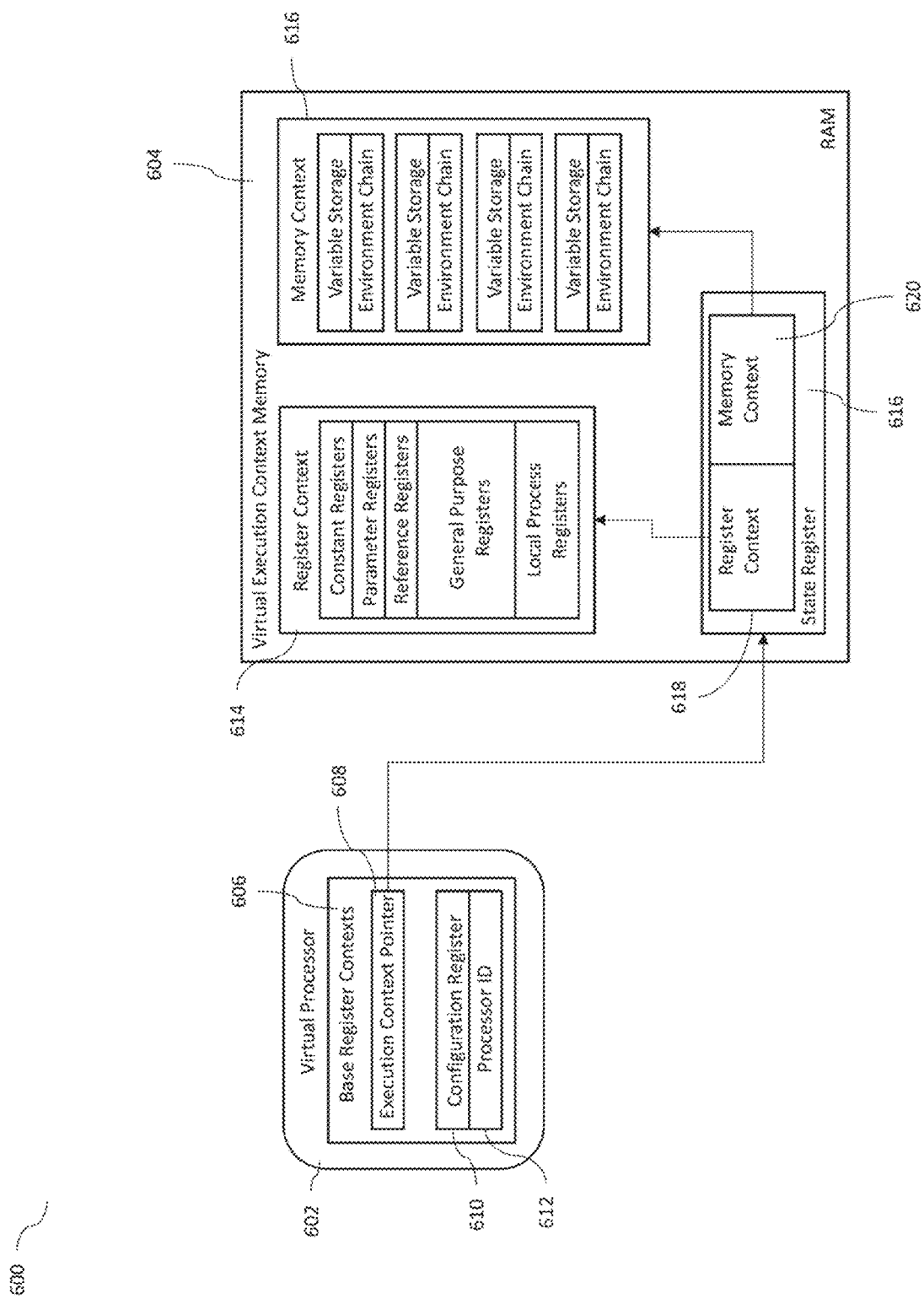
FIG. 6 is a functional block diagram of a virtual processor system and memory arrangement including a state register supporting a preferred embodiment utilizing dynamic register files.

An additional embodiment of the invention utilizes a virtual processor in conjunction with execution context memory. As shown in FIG. 5A, virtual processor system 500*a* is similar to the system depicted in FIG. 2. Virtual execution context memory 504 is a software-defined construct within RAM and configured to have precisely enough capacity to contain the register context information 514 and paired memory context information 516. Register context pointer 508 provides the particular RAM address at which the register context information is stored, and memory context pointer 510 provides the particular RAM address at which the memory context information is stored. However, unlike the system of FIG. 2, the processor (502) in which these context pointers reside is a virtual processor. Virtual processor 502 is comprised of information indicative of a register context pointer (508), a memory context pointer (510). Virtual processor 502 can also include other configuration register information (512) required to specify a given virtual processor state, as well as virtual processor identification information (518), which would serve to distinguish between individual virtual processors in systems employing multiple virtual processors. As with the virtual execution context information (514) of system 500*a*, the information comprising virtual processor 502 is stored within RAM (see FIG. 5B). The processor is effectively virtualized in a manner similar to that of a thread or processor state, and the virtual processor information is processed one or more logic cores as assets become available. In the system (500*b*) depicted in FIG. 5B, the information representing the virtual processor can be stored within the same RAM (520) utilized for storage of the virtual execution context information.

Figure 7A:
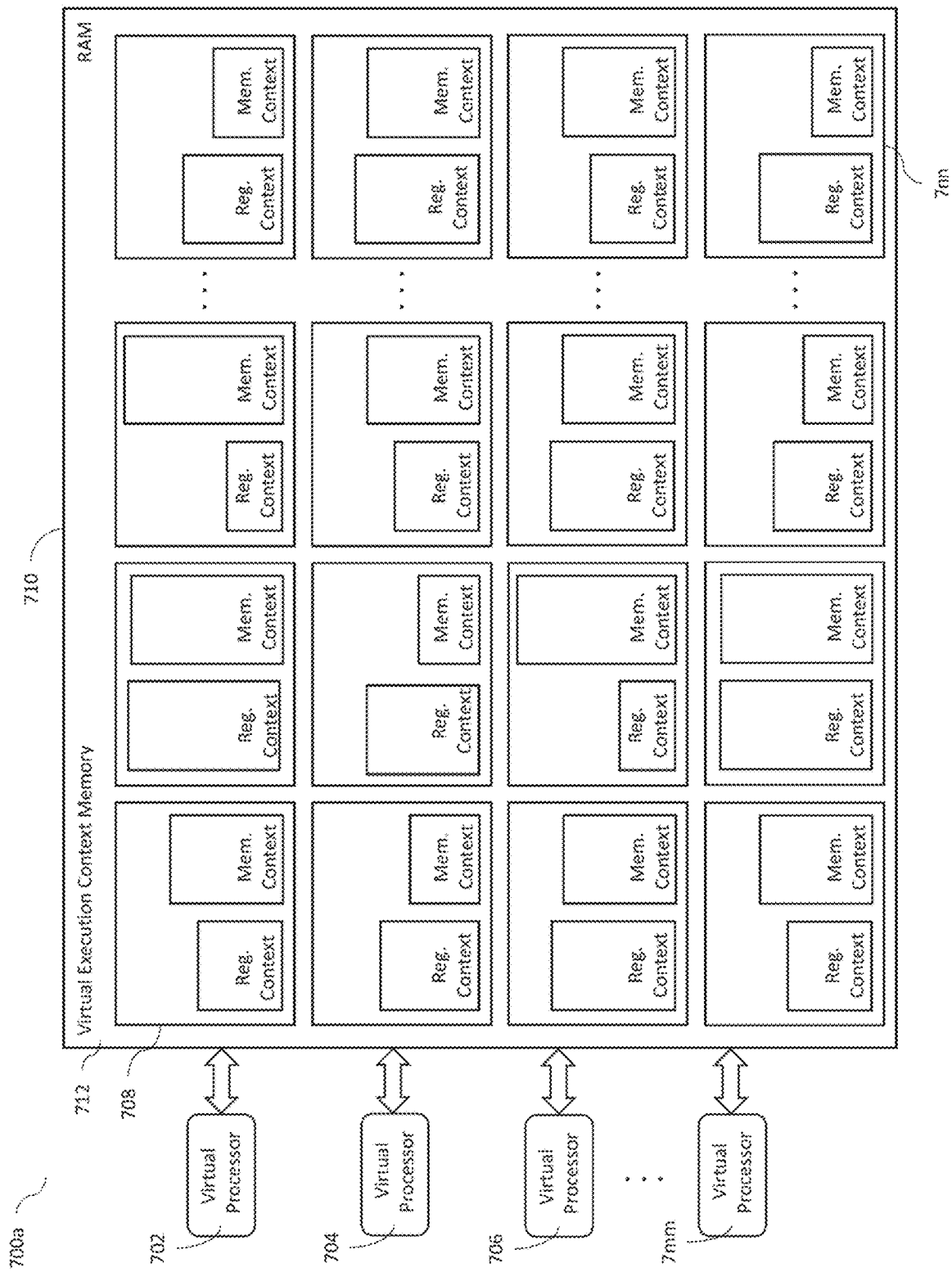
FIG. 7A is a functional block diagram of system of multiple logical processors and memory arrangements supporting a preferred embodiment utilizing dynamic register files.
Figure 7B:
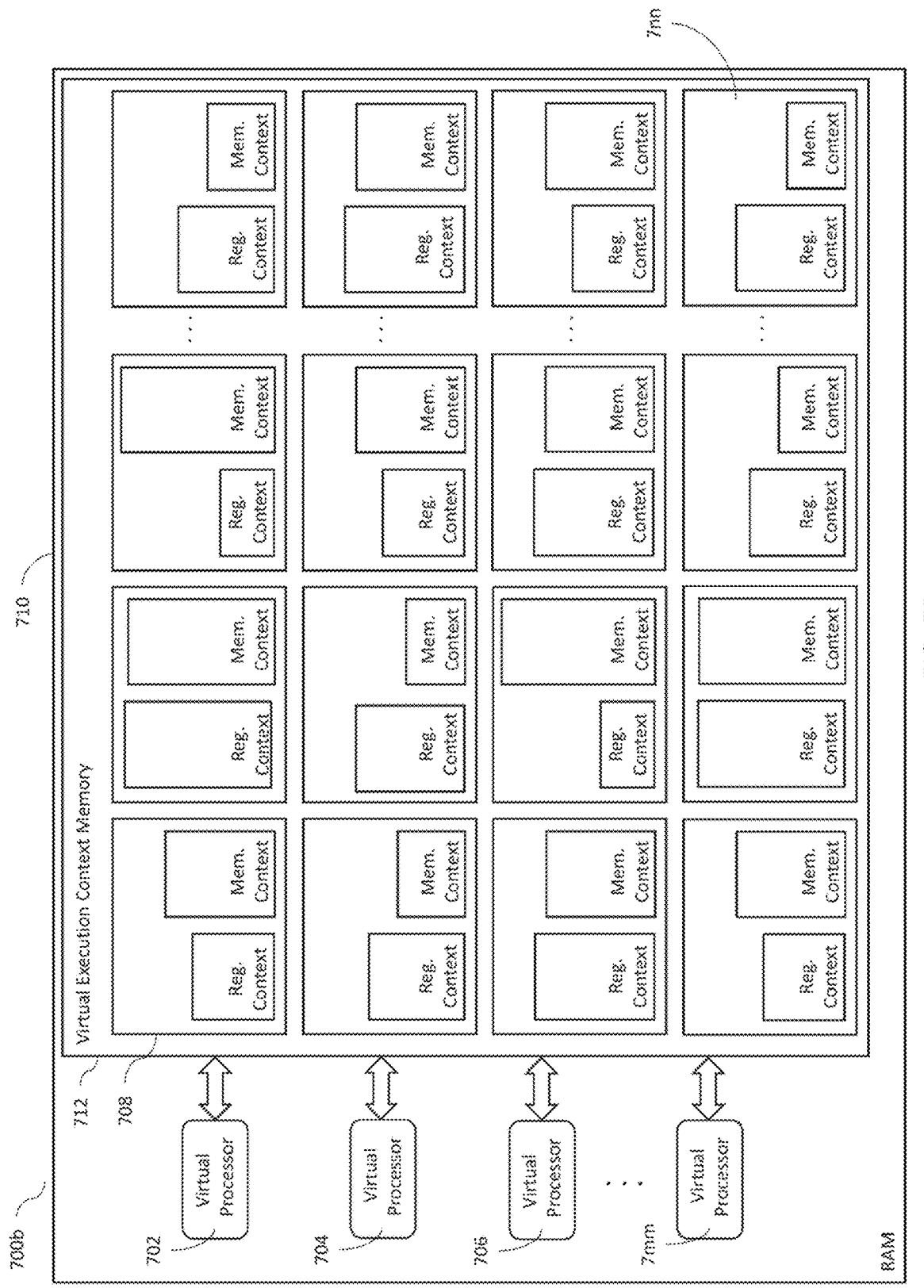
FIG. 7B is a functional block diagram of system of multiple logical processors and memory arrangements supporting an additional preferred embodiment utilizing dynamic register files.
Figure 8:
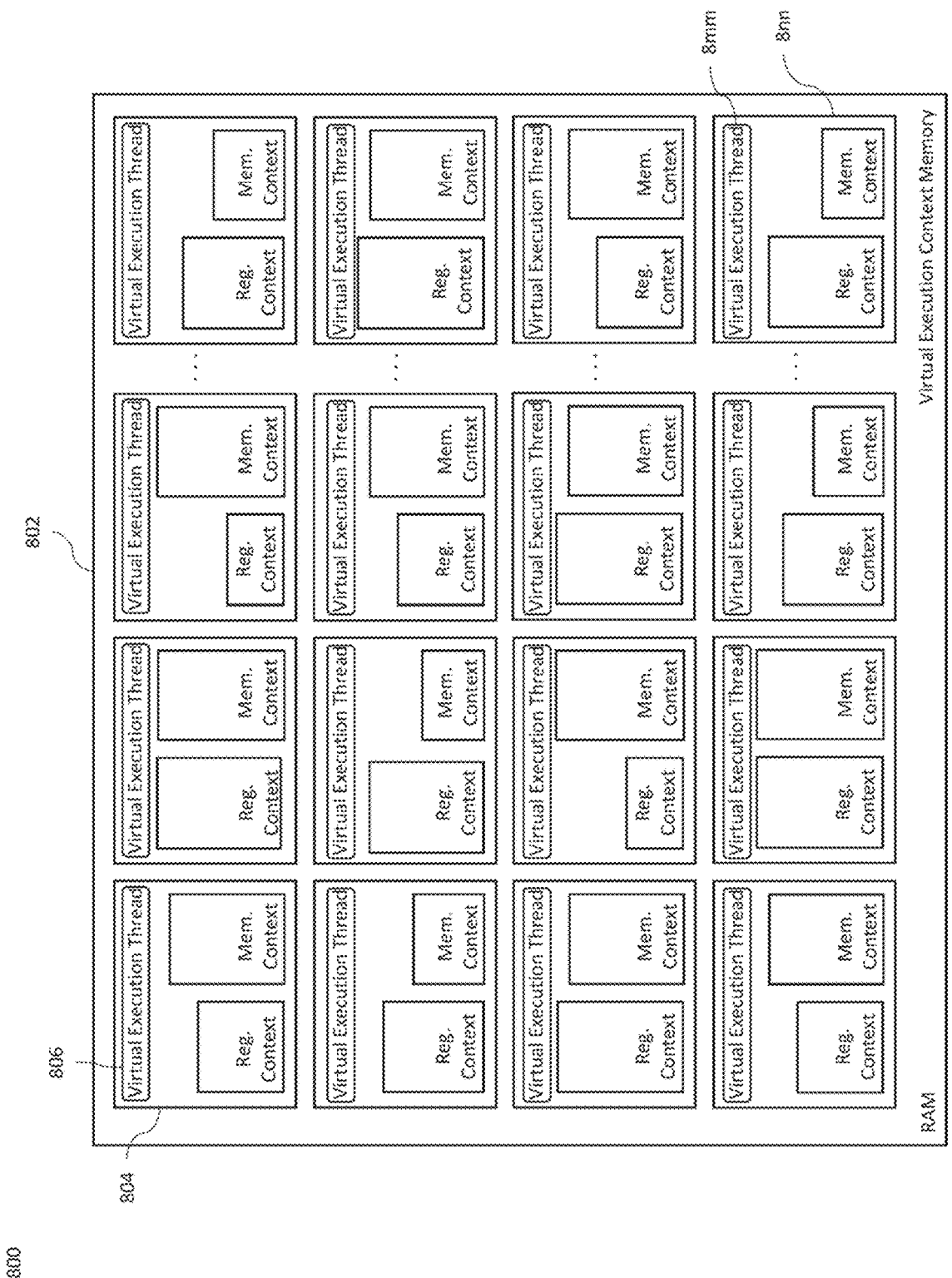
FIG. 8 is a functional block diagram of system of multiple logical processors and memory arrangements supporting a preferred embodiment utilizing dynamic register files.

Yet another embodiment of the invention is depicted in FIG. 8. In system 800, RAM 802 is shown to contain register and memory context pairings (804-8 *nn*), wherein each pairing defines a different virtual processor state. In this regard, system 800 is similar to the systems depicted in FIGS. 7A and 7B. However, unlike those systems, for each of the register and memory context pairings within system 800 there exists an associated virtual execution thread (806-8 *mm*) stored within RAM 802. Each of these virtual execution threads can be viewed as a logical extension of the virtual execution context memories present in the previously discussed systems. The information within a given virtual processor base register contexts and virtual execution context memory pairing is a self-contained definition of a processor state, each of which is capable of running as an independent thread. In systems 700 *a* and 700 *b*, mm processors are responsible for executing nn pairing of register and memory context information, and where mm is not equal to nn. Contrastingly, system 800 associates a virtual execution thread with each of the nn pairings, allowing nn processes to run concurrently and independently, subject to the scheduling and capacity limits of the available physical processing core(s) and/or the underlying operating system.

FIG. 7A provides a functional block diagram of a system (700*a*) wherein virtual execution context memory 702 includes paired register and memory context information 708 through 7*nn* stored within RAM 710. These right-sized register and memory context pairings defines a different virtual processor state for processing a particular thread. Each of the register and memory context pairing is accessible by any one of virtual processors 702-4*mm*, utilizing register and memory context pointer information stored within each virtual processor. This enables any available resources within any one of the virtual processors to assume the state and execute the thread defined by any one the of the register and memory context pairings stored within virtual execution context memory 712.

As with the virtual execution context information (712) of system 700*a*, the information comprising virtual processors 702-*mm* in system 700*b* is stored within RAM (see FIG. 7B). These processors are effectively virtualized in a manner similar to that of a thread or processor state, and the virtual processor information is processed by one or more logic cores as assets become available. In system 700*b*, the information representing the virtual processor is stored within the same RAM (710) utilized for storage of the virtual execution context information.

Yet another embodiment of the invention is depicted in FIG. 8. In system 800, RAM 802 is shown to contain register and memory context pairings (804-8*nn*), wherein each pairing defines a different virtual processor state. In this regard, system 800 is similar to the systems depicted in FIGS. 7A and 7B. However, unlike those systems, for each of the register and memory context pairings within system 800 there exists an associated virtual execution thread (806-8*mm*) stored within RAM 802. Each of these virtual execution threads can be viewed as a logical extension of the virtual execution context memories present in the previously discussed systems. The information within a given virtual processor base register contexts and virtual execution context memory pairing is a self-contained definition of a processor state, each of which is capable of running as an independent thread. In systems 700*a* and 700*b*, mm processors are responsible for executing nn pairing of register and memory context information, and where mm is not equal to nn. Contrastingly, system $00 associates a virtual execution thread with each of the nn pairings, allowing nn processes to run concurrently and independently, subject to the scheduling and capacity limits of the available physical processing core(s) and/or the underlying operating system.

Figure 9B:
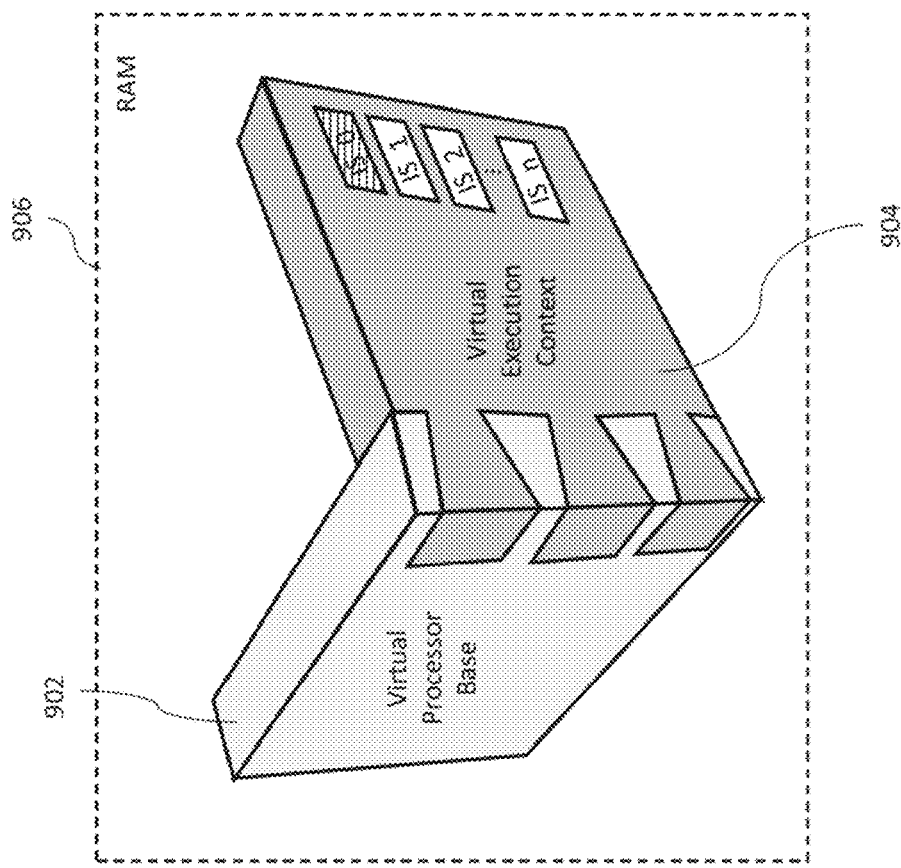
FIG. 9B is a functional block diagram of the virtual processor base/virtual execution context arrangement of FIG. 9A in an attached state.
Figure 9A:
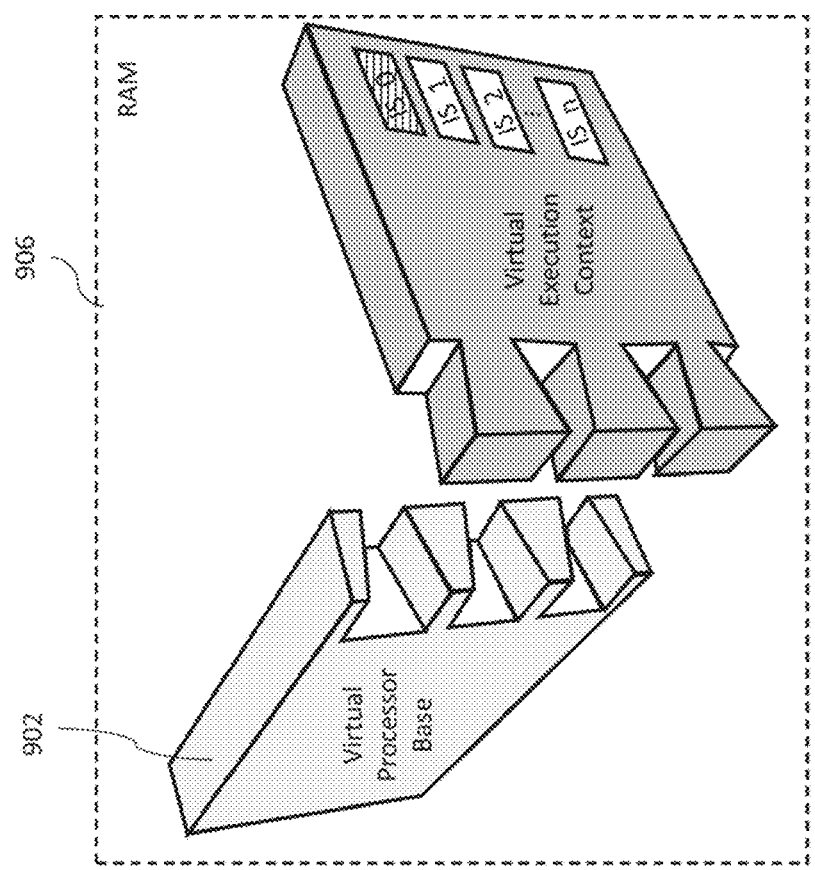
FIG. 9A is a functional block diagram of a virtual processor base/virtual execution context arrangement.

The systems and processes described above provide for the conceptual separation of a virtual processor into multiple, discrete elements, For example, in system 500*a*, 500*b*, 600, 700*a* and 700*b*, the two discrete elements are a virtual processor and a virtual execution context memory. These two components, when coupled provide for the active execution of particular processor state or thread. Prior to such coupling, each component is merely a store of information with a RAM system; completely separate from one another and individually incapable of executing any process or state. FIG. 9A provides a functional depiction of these two discrete components: virtual processor base ("VPB") 902 and virtual execution context ("VEC") 904, which includes instruction sets IS 0 through IS n. The information that comprises VPB 902 is similar to that shown to reside in the virtual processors of systems 500*a*, 500*b*, 600, 700*a* and 700*b*. VEC 904 includes information similar to that shown to reside in the virtual execution memories of systems 500*a*, 500*b*, 600, 700*a* and 700*b*. Both VPB 902 and VEC 904 are shown to be stored in RAM 906. Only upon the mating of the information that comprises VPB 902 with the information of VEC 904 does VPB 902 access the information within VPB 904 and thereby create a viable virtual processor capable of executing a given state/thread (FIG. 9B). When a VPB and a VEC effect such a mating, they are it is referred to as "attached" to one another.

Each of the discrete elements, by itself would be nothing more than a region (or collection of regions) of memory within one or more RAM devices. The elements would not present a productive target for unauthorized parties to access as they fail to provide any indicia useful in attaining unauthorized platform-wide access. Without a reliable method to determine the internal organization of a register or a memory context, the register content cannot properly construed. The information contained in VEC 904 cannot be leveraged by any processor (virtual or otherwise) that lacks the pointers to direct it to the specific memory addresses within RAM 906 at which the information that is VEC 904 resides. The state/thread information and the various pointers comprising VPB 902 provide a means of viably locating, accessing and processing the information within execution context 904. A hacker or intruder would gain little from the usable information from the disassociated elements.

Instruction set IS 0 is depicted as being different than the other instruction sets shown in FIGS. 9A and 9B. For any processor, including a virtual processor, there must exist a base set of instructions that enable the processor to initialize and process other instructions. IS 0 is that base set and must therefore must be included in every virtual execution context. When VPB 902 is attached to a VEC 904, the VBP immediately references and executes base instruction set IS 0. This initializes the virtual processor (a virtual boot) and enables it to access and execute other virtual execution instructions within the VEC 904.

The non-base instruction sets stored within VEC 904 can be related to various processes and functionalities that need not be related to each other. For example, IS 1 can be instructions to execute a program for securely encrypting information, IS 2 could be an artificial intelligence application for image analysis, etc. Access to each of the instruction sets within a given VEC can be controlled based upon the user rights associated with the accessing VPB. For example, a user might pay a first fee to obtain a VPB with permission to access IS 1 (encryption program), and a much higher fee for a VPB authorized to access IS 2 (AI analysis). A single VEC could be sequentially accessed by a number of VPBs, each first executing IS 0 and then accessing further instruction sets in accordance with the rights that particular user had been granted.

Figure 9C:
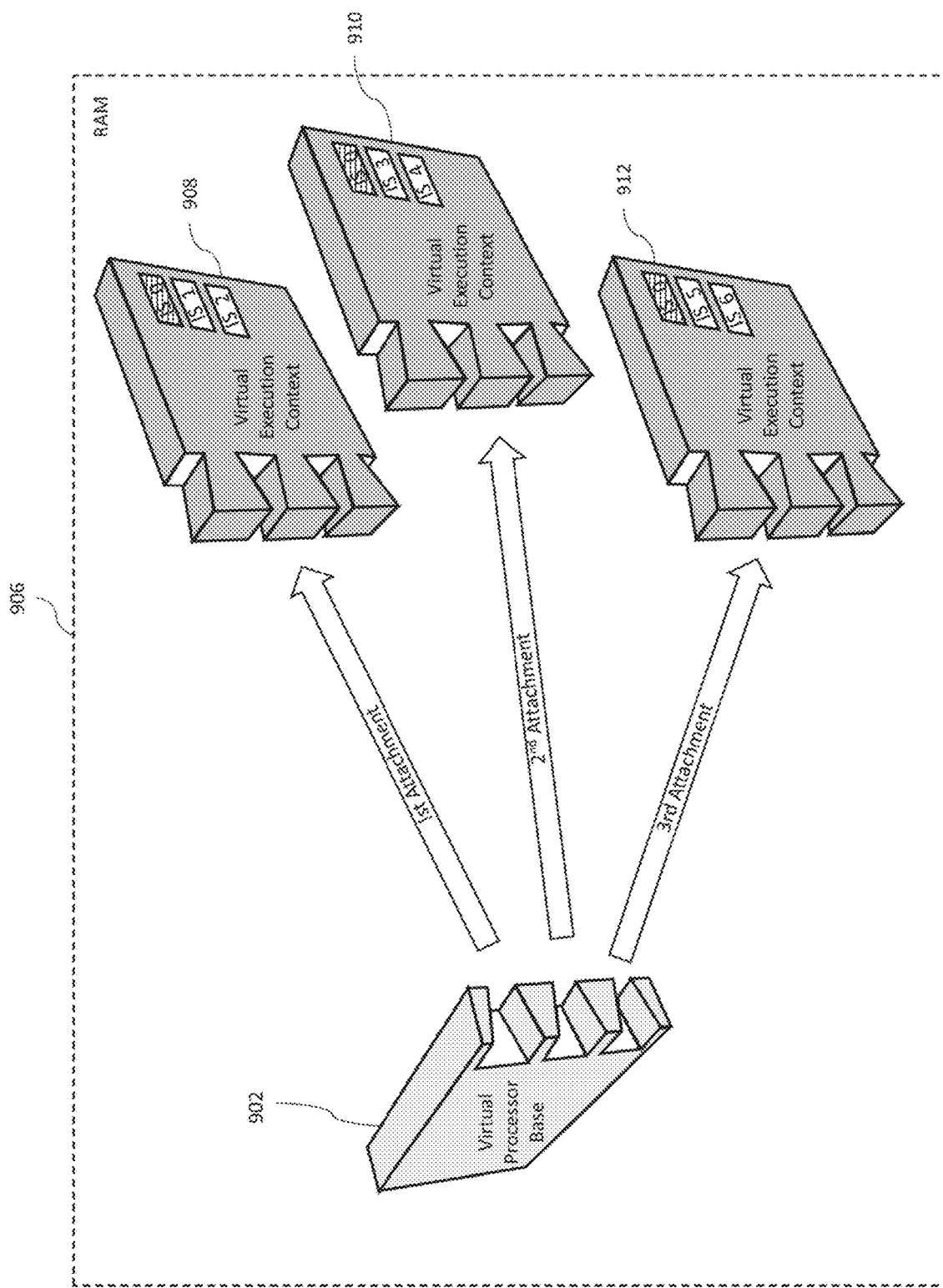
FIG. 9C is a functional block diagram of a virtual processor base/virtual execution context arrangement utilizing multiple virtual execution contexts.

Furthermore, a given VPB can access numerous VECs. FIG. 9C shows VPB 902 and three unique VECs (908, 910 and 912) within RAM 906. The particular thread being executed by VPB 902 first causes the VPB to attach to VEC 908 and execute IS 0. The thread then access IS 2 within VEC 908, followed by IS 3 in VEC 910 and finally IS 6 in VEC 912. For this particular thread/process, IS 6 is the last set of instructions. Consequently, VPB 902 would next access IS 0 within VEC 912. In doing so, the VPB 902 would essentially re-initialize itself and effectively terminate. This allows for dynamic creation and termination of VPBs on an as needed basis.

Figure 10A:
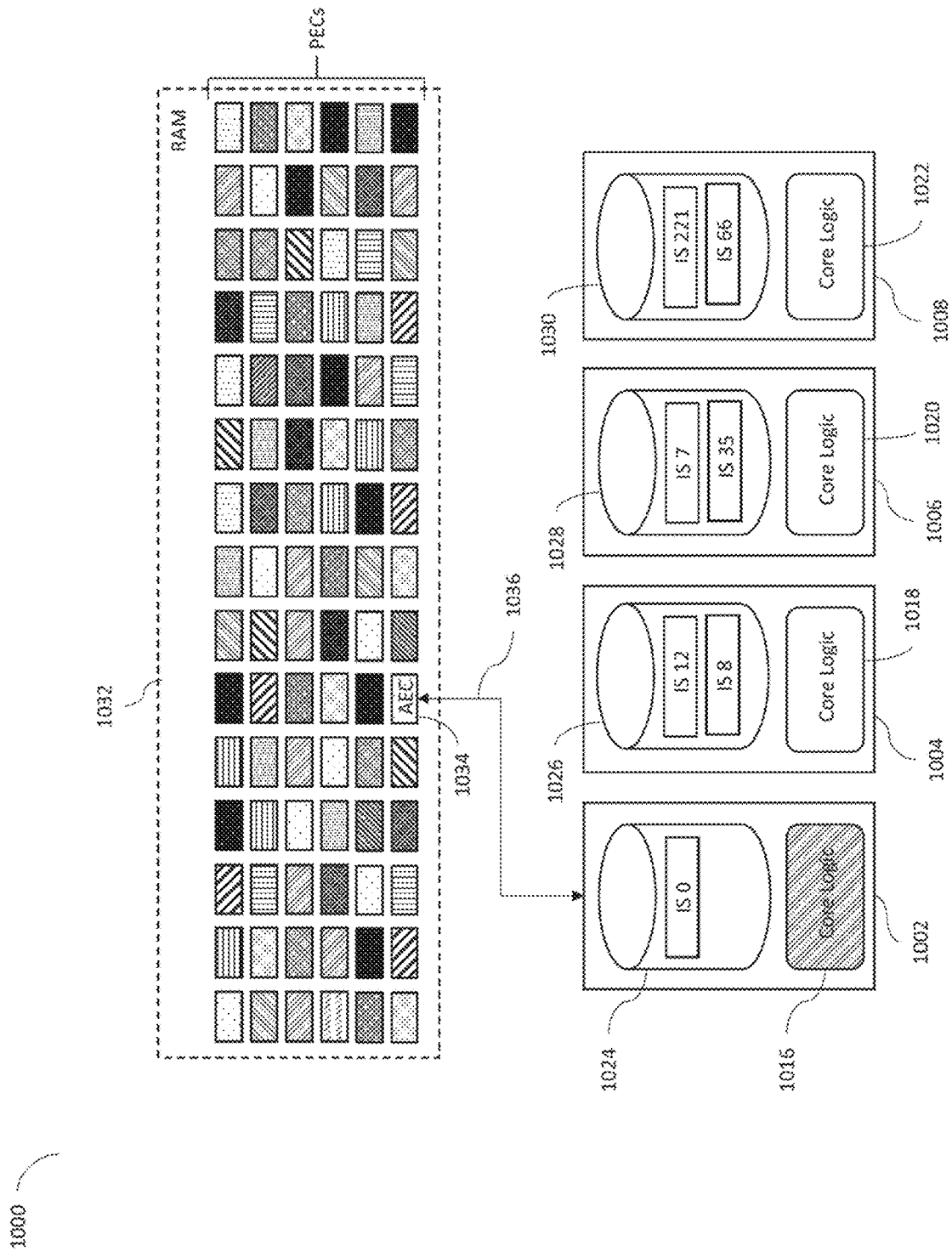
FIG. 10A provides a functional block diagram of a first state for a single-process system utilizing chiplets and physical execution contexts.

FIG. 10A provides a functional block diagram of a physical system 1000 that supports processes that share many aspects with the VPB/VEC systems of FIG. 9A-C. The system includes four specialized integrated circuits or "chiplets" (1002, 1004, 1006, and 1008), each of which includes a core logic (1010-1022) and an associated core memory (1024-1030) storing one or more instruction sets (IS 0, IS 12, IS, 7, etc.). It also includes RAM 1032 storing information representing 90 dissimilar physical execution contexts ("PECs"). Each PEC contains information similar to that found in the previously described VECs, but does not contain any instruction sets. Unlike the systems depicted in FIGS. 9A-C, system 1000 is adapted to provide a switchable connection serially linking an active execution context ("AEC") with a multiplicity of chiplets. As shown, AEC 1034 is switchably linked (1036) with chiplet 1002, allowing the process/thread of AEC 1034 to utilize the logic core 1016 and execute IS 0. As with system 900, IS 0 is a base set of instructions that enables the processor to initialize and then process other instructions.

Figure 10B:
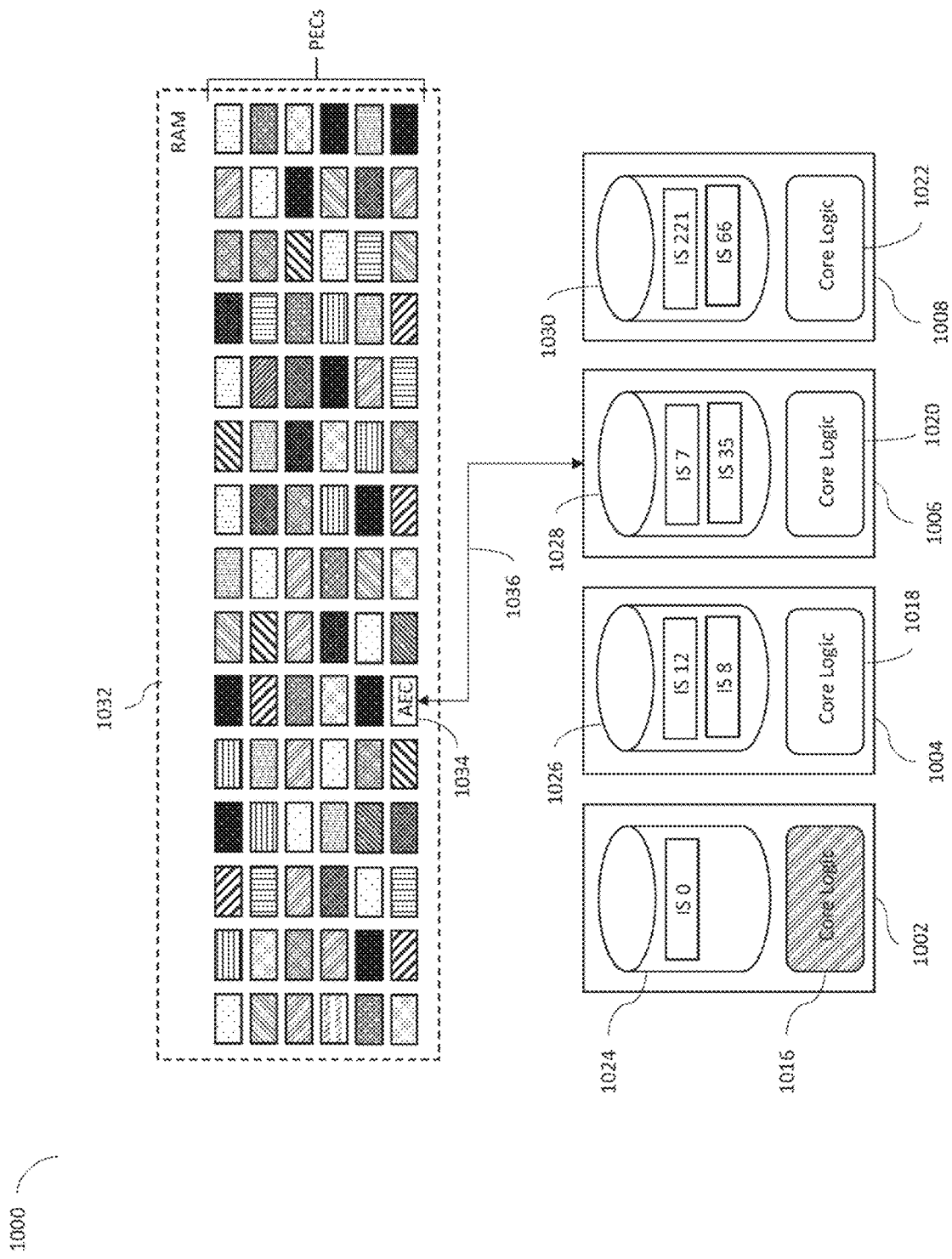
FIG. 10B provides a functional block diagram depicting the system of FIG. 10A in a second state.
Figure 10C:
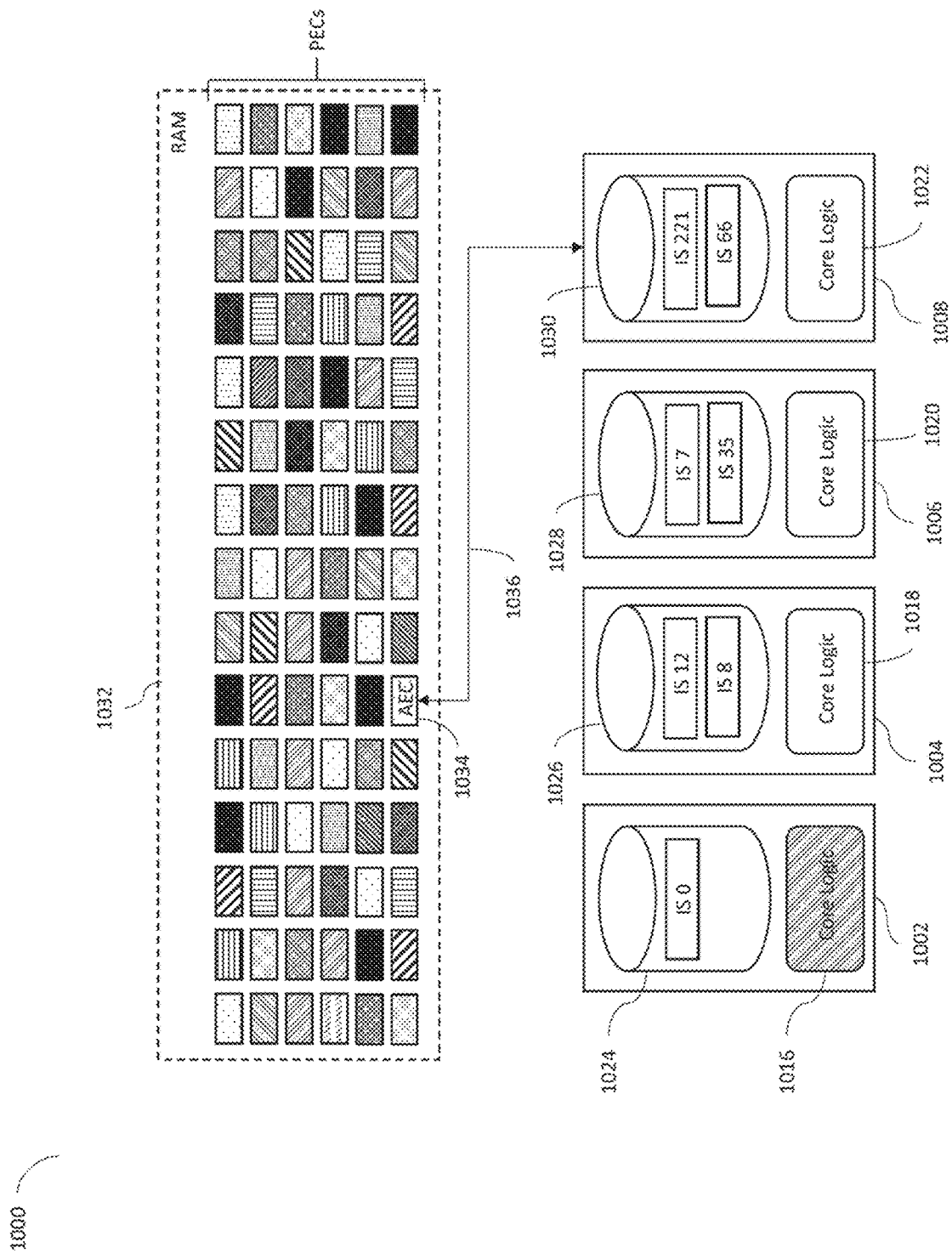
FIG. 10C provides a functional block diagram depicting the system of FIG. 10A in a third state.

As depicted in FIG. 10B, after executing IS 0 and initializing, AEC 1034 establishes a switchable link (1036) to chiplet 1006 and executes IS 35 via core logic 1020. Accessing a different chiplet allows AEC 1034 to utilize an entirely different logic core, and therefore permits access to task-specific logic architecture. For example, if IS 35 executed a video-related process, core logic 1020 could be processor specifically adapted for image and graphical processing. Following the execution of IS 35, the thread specified by AEC 1034 could then continue, perhaps establishing a switchable link (1036) to chiplet 1008 and executing IS 66 via core logic 1022 (see FIG. 10C). Again, core logic 1022 could be specifically adapted to execute the particular type of processing that IS 66 (and IS 221) require.

Figure 11:
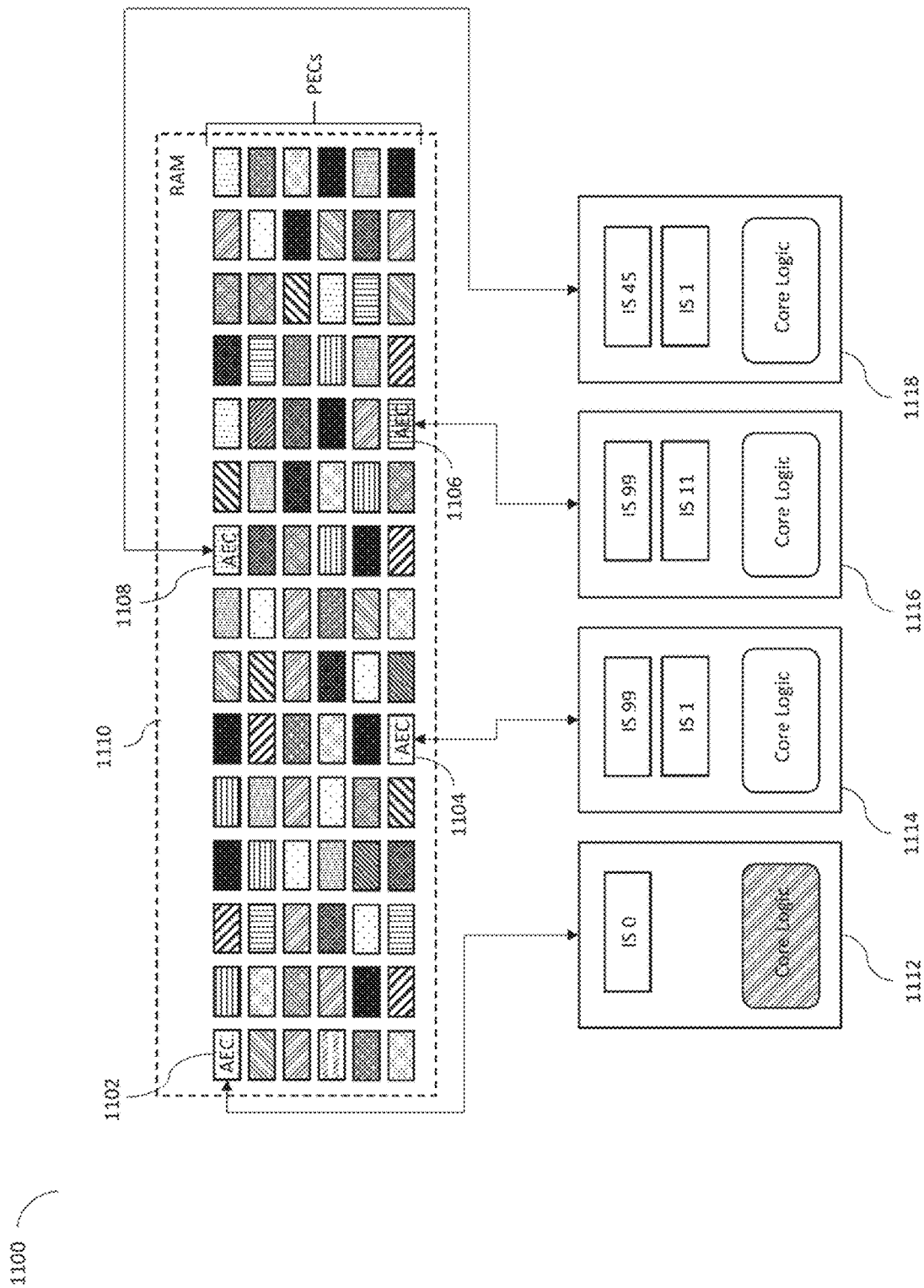
FIG. 11 provides a functional block diagram depicting a multi-process system utilizing chiplets and physical execution contexts.

FIG. 11 depicts a system (1100) wherein the functionality of system 1000 is applied to an arrangement enabling multiple PECs to be active concurrently. As shown, AECs 1102, 1104, 1106, and 1108 within RAM 1110, are switchably linked to chiplet 1112, 1114, 1116 and 1118, respectively. Each AEC can only be active on one ISE at a time and therefore has exclusive access to its range of instruction sets. However, more than one AEC can access identical instruction sets if the chiplets are so configured. For example, in system 1100, IS 1 is found in both chiplet 1114 and chiplet 1118. This permits two AECs (1104, 1108) to access a copy of that instruction set simultaneously. The same is true for instruction set IS 99, which is found in chiplets 1114 and 1116. If certain instruction sets are utilized more than others, copies can be placed in multiple chipsets to so as to increase availability.

Of course, in system 1100 an operating system is required to schedule the execution contexts coordinates the assignment of chiplet to an active execution context. This is very different than where the processor itself can switch at will between them (system 1000). In the processor-controlled model, the additional cores are idle until the AEC encounters an instruction resident in a different chiplet than what is currently active. In the OS controlled model, each chiplet's core logic can be considered a specialized processor unto itself. While the processor-controlled model may have a single-threaded performance advantage, the OS controlled model can make better use of all the processors resources.

Although the invention herein has been described with reference to particular embodiments, it is to be understood that these embodiments are merely illustrative of the principles and applications of the present invention. For example, additional context pointers, beyond register and memory context pointers, can also be associated with a given processor state or thread, thereby enabling the disclosed system and method to access and process information additional context information stored in RAM. The context pointers not be limited to pointing to information stored in a conventional RAM. Any memory or storage technology with locations addressable address or other specific indicator could be utilized. The logic cores depicted as being within chiplets could be multiple-core processors, and housed in any package or housing suitable for such. The invention could also utilize non-volatile physical memory, so as to preserve execution context information when power is removed.

What is claimed is:

1. A computer system including a processor and memory configured to define a component-based virtual processor comprising:
the processor configured to generate within the memory;
at least one virtual execution context element comprising information defining a particular processor state and at least one set of executable instructions, wherein the information defining the particular processor state and the at least one set of executable instructions is stored in a specific portion of a first addressable memory having a capacity configured by the processor at run-time to be equal to a memory space required to store the information defining the particular processor state and the at least one-set of executable instructions; and
at least one virtual processor base element comprising information stored in at least one specific portion of a second addressable memory, the stored information defining at least one base register pointer, wherein the at least one base register pointer comprises at least one memory address enabling the at least one virtual processor base element to access the specific portion of the first addressable memory storing the information defining the particular processor state and the at least one set of executable instructions, and wherein a capacity of the at least one specific portion of the second addressable memory is configured by the processor at run-time to be equal to a memory space required to store the information defining the at least one base register pointer.

2. The system of claim 1 further comprising at least one logic cure adapted to execute the at least one set of executable instructions upon the attachment of the at least one virtual processor base element to the at least one virtual execution context element.

3. The system of claim 1 wherein the at least one set of executable instructions comprises a plurality of instructions each of which defines a separate functionality for the component-based virtual processor.

4. The system of claim 1 wherein the base register pointer comprises at least one of the following:
a register context pointer; and
a memory context pointer.

5. The system of claim 1 wherein the first and second addressable memories are both located within a single physical addressable memory.

6. The system of claim 1 wherein at one of the first and second addressable memories comprises at least one of the following:
static random-access memory;
dynamic random-access memory; and
non-volatile memory.

7. The system of claim 1 wherein the at least one set of executable instructions comprises instructions for the initialization of the component-based virtual processor.

8. The system of claim 7 wherein the component-based virtual processor once initialized, is adapted to terminate upon the re-execution of instructions for component-based virtual processor initialization.

9. The system of claim 1 further comprising at least a plurality of additional virtual execution context elements, each comprising information defining an additional processor state and at least one set of additional executable instructions stored in a specific portion of an addressable memory having a capacity based upon the memory space required to store the information defining the additional processor state and the at least one set of additional executable instructions.

10. The system of claim 9 wherein the addressable memory comprises the first addressable memory.

11. The system of claim 9 wherein the at least one base register pointer comprises at least a second memory address associated with at least one of the plurality of additional virtual execution context elements.

12. The system of claim 11 further comprising at least one logic core adapted to execute the at least one set of executable instructions upon the attachment of the at least one virtual processor base element to the at least one virtual execution context element, and thereafter execute a process associated with at least one of the plurality of additional virtual execution context elements.

13. A method of defining a component-based virtual processor comprising:
storing in a specific portion of a first addressable memory at least one virtual execution context element comprising information defining a particular processor state and at least one set of executable instructions, wherein a capacity of the portion of the first addressable memory is configured by the processor at run-time to be equal to a memory space required to store the information defining the particular processor state and the at least one set of executable instructions; and
storing in a specific portion of a second addressable memory at least one virtual processor base element comprising information defining at least one base register pointer, wherein the at least one base register pointer comprises at least one memory address enabling the at least one virtual processor base element to access the specific portion of the first addressable memory storing the information defining the particular processor slate and the at least one set of executable instructions, and wherein a capacity of the at least one specific portion of the second addressable memory is configured by the processor at run-time to be equal to a memory space required to store the information defining the at least one base register pointer.

14. The method of claim 13 wherein the at least one set of executable instructions comprises a plurality of instructions, each of which defines a separate functionality for the component-based virtual processor.

15. The method of claim 13 wherein the base register pointer comprises at least one of the following:
   a register context pointer; and
   a memory context pointer.

16. The method of claim 13 wherein the first and second addressable memories are both located within a single physical addressable memory device.

17. The method of claim 13 wherein the addressable memory comprises at least one of the following:
   static random-access memory;
   dynamic random-access memory; and
   non-volatile memory.

18. The method of claim 13 further comprising attaching the at least one virtual processor base element to the at least one virtual execution context element.

19. The method of claim 13 further comprising executing the at least one set of executable instructions utilizing at least one logic core.

20. The method of claim 19 wherein the at least one set of executable instructions comprises instructions for the initialization of the component-based virtual processor.

21. The method of claim 20 further comprising initializing the component-based virtual processor.

22. The method of claim 21 further comprising the step of terminating the component-based virtual processor upon the re-execution of instructions for component-based virtual processor initialization.

* * * * *